United States Patent [19]

McMahon, Jr.

[11] 3,781,670

[45] Dec. 25, 1973

[54] AC PERFORMANCE TEST FOR LARGE SCALE INTEGRATED CIRCUIT CHIPS

[75] Inventor: Maurice T. McMahon, Jr., Wappingers Falls, N.Y.

[73] Assignee: International Business Machines Corporation, Armonk, N.Y.

[22] Filed: Dec. 29, 1972

[21] Appl. No.: 319,122

[52] U.S. Cl............. 324/57 R, 29/574, 324/73 PC, 324/158 R
[51] Int. Cl............................................. G01r 27/00
[58] Field of Search................... 324/57 R, 57 DE, 324/73 PC, 158, 181; 29/574

[56] References Cited
UNITED STATES PATENTS
3,436,652  4/1969  Asztalos............................ 324/57 R
3,443,227  5/1969  Kelly et al....................... 324/158 R FOREIGN PATENTS OR APPLICATIONS
1,115,064  5/1968  Great Britain.................... 324/57 R Primary Examiner—Stanley T. Krawczewicz
Attorney—Richard C. Sughrue et al.

[57] ABSTRACT

After the circuit elements are formed in a large scale integrated circuit chip, but before the chip is personalized by a final metallization step in which the circuit elements are electrically interconnected in desired final circuit configuration, all of the circuit elements are temporarily interconnected in a recirculating test loop by a preliminary metallization step. Operating power is then applied to the circuit elements, and the frequency of the resultant self-oscillation of the loop is observed as an indication of the AC performance of the chip. If the chip passes the AC performance test, the temporary recirculating loop connections are interrupted, and the circuit elements are personalized by the final metallization step.

5 Claims, 1 Drawing Figure

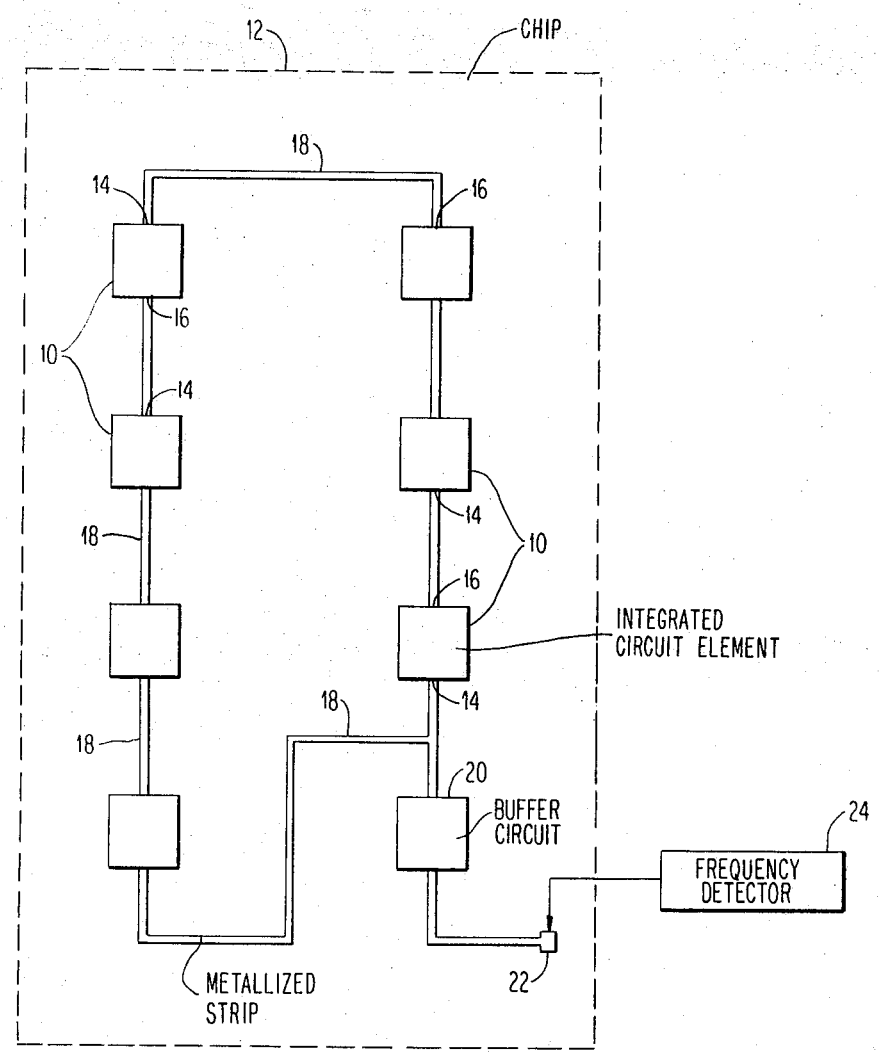

AC PERFORMANCE TEST FOR LARGE SCALE INTEGRATED CIRCUIT CHIPS

BACKGROUND OF THE INVENTION

1. Field of the Invention

This invention relates to the field of fabrication of large scale integrated circuit chips and, more particularly, to a method of testing the AC or dynamic performance of the chip during the fabrication process and prior to the final metallization step to personalize the chip circuits.

2. Description of the Prior Art

AC performance testing of large scale integrated circuit chips by the use of test circuits, such as a recirculating test loop, including some of the integrated circuit elements, is broadly known in the prior art and is described, for example, in IBM Technical Disclosure Bulletin, Volume 13, No. 5, Oct. 1970, page 1373. However, in this prior art, the test circuit is formed during the final metallization step, and, furthermore, only certain circuit elements in selected areas of the chip are dedicated for personalization into the self-recirculating test loop. Consequently, all of the circuit elements are not tested for AC performance, and in addition, the circuit elements which are dedicated to the AC test are not available for use in the final circuit configurations of the chip.

AC testing is required to guarantee the quality level of many large scale integrated circuit logic technologies, since several of the possible failure modes do not produce a DC logic failure but result only in a logic circuit switching slower than expected. The correct Boolean function is realized, but the circuit will not operate in a machine environment because of timing problems.

To perform a complete AC test on a large scale integrated circuit chip using prior art techniques is a very expensive procedure, since the test must be personalized for each logic circuit to be tested. For each circuit, the input transitions must be generated, and the logic simulated against the technology delay equation, to produce a measurable output response. Consequently, there is a need for a large scale integrated circuit chip tester that has an AC environment on every pin of the circuit chip and a capability of making accurate time measurements in a short amount of time.

SUMMARY OF THE INVENTION

The broad object of this invention is to provide a method for testing the AC performance of large scale integrated circuit chips wherein accurate testing for detection of AC failure modes can be performed as an in-process test, independent of the personality of the final logic to be implemented on the chip.

Another object of the invention is to provide an AC testing method for a large scale integrated circuit chip wherein, prior to final personalization of the chip, the circuit elements are temporarily interconnected in a preliminary metallization step, power applied to the circuit elements, the resultant switching delays observed, and then the temporary interconnections removed.

Still another object of the invention is to provide an improved AC testing method for a large scale integrated circuit chip, which method provides verification that all circuits on a master slice of a large scale integrated circuit chip switch in both directions within a specified switching time.

In accordance with a preferred embodiment of the invention, the above objects are accomplished by interconnecting all the circuit elements on a master slice of a large scale integrated circuit chip in such a way that an AC recirculating loop test can be performed prior to the final metallization step which personalizes the chip into the desired final circuit configuration. The switching speeds of the circuit elements can be indirectly measured by observing the frequency of self-oscillation through a single input/output pad for each recirculating loop. The sum of the circuit delays in the loop is equal to $\frac{1}{2}f$ where $f$ is the measured frequency of self-oscillation. If the total delay is less than a predetermined value, then the circuit elements in the loop pass the test.

After the AC performance test is completed and it is vertified that the circuits on the chip have no AC or DC defects, the metal used to temporarily connect the circuit elements in recirculating loops is removed before the final personality metallization step.

BRIEF DESCRIPTION OF THE DRAWING

The single FIGURE is a schematic diagram illustrating the manner in which all of the circuit elements of a large scale integrated circuit chip are interconnected in a preferred embodiment of the AC testing method of the invention.

DESCRIPTION OF THE PREFERRED EMBODIMENT

Even though a drawing is not necessary for an understanding of the invention, the single figure is useful to illustrate the manner in which the preferred embodiment of this invention is carried out.

By any of several known integrated circuit fabrication processes, a plurality of integrated circuit elements 10 is formed in a semiconductor chip or wafer 12. As an example, the circuit elements may comprise 200 to 1,000 logic gate circuits in a large scale integrated circuit chip.

Each individual circuit element 10 is capable of performing a logical inversion function and may be a NAND or a NOR element. Each element 10 is also capable of switching in both directions.

In accordance with the preferred embodiment of this invention, prior to the final personality metallization step, the output connection 14 of each circuit element is connected to an input connection 16 of another chip in a preliminary metallization step until all of the circuit elements are effectively connected in series by metallized strips 18 to form a recirculating loop. These metallized connecting strips between circuit elements, as will be seen, are only temporary.

One of the circuit elements, such as 20, is utilized as a buffer circuit and is connected to any desired point in the loop between two circuit elements. The output of the buffer circuit 20 drives IO pad 22 which is a metallized area on the chip.

Contrary to prior art concepts, power is now applied to the loop by applying the normally D.C. operating potentials to all the circuit elements, thereby causing the loop to oscillate. The frequency of this self-oscillation of the loop is probed at the IO pad by a suitable frequency detector. The oscillation frequency is an indirect measure of the switching speeds of the circuit elements in the loop. The sum of the circuit delays in the loop is equal to $\frac{1}{2}f$ where $f$ is the measured frequency of oscillation. Another requirement for oscillation is that the loop contain an odd number of circuit elements 10. Any number of recirculating loops can be formed on the chip depending upon the number of IO pads that can be probed to the test accuracy desired. The shorter the loop, the less the robability that a slow circuit element will be masked out by one or more fast circuit elements.

Once a loop has satisfactorily passed this AC performance test by exhibiting a total delay time below a predetermined acceptable value, the temporary circuit interconnections 18 are removed or interrupted. This interruption may be accomplished before or during the personalization or final metalization of the circuit elements into desired final circuit configurations. The interruption can be accomplished by an additional electronic beam and etch operation or by an additional masking and etch operation.

Also, as an alternative to removing the loop connecting strips, a light sensitive input terminal may be added to each circuit and used as the input terminal for the recirculating loop. The AC test is then performed by exposing the chip to light to render these light sensitive terminals conductive while applying power to the chip under test. After final personalization, the chip must then be kept in the dark for normal operation or else the light sensitive devices must be covered with an opaque material before personalization in order to make sure that the temporary test loop remains open.

When this AC performance test is added to a semiconductor process line and only chips that pass the AC test are finally personalized, the quality of the final product will be a function of only the personalization process. The resulting high yields permit a less costly final test, and AC testing of the final product can be completely eliminated. Furthermore, since the improved AC testing method of this invention verifies the operation of all the circuit elements on the chip, the final personalization process can take advantage of this test, since only chip sites that pass this test will be personalized, thus increasing throughput and offsetting the extra step of removing the recirculating loop metal. Furthermore, any temporary connection strips which would also appear in the final circuit configuration need not be removed prior to the final personalization process.

Even though the preferred embodiment of the invention has been described with reference to a test circuit in the form of a recirculating loop, the invention is not limited to any specific form of test circuit. For example, a test circuit may be in the form of a shift register. In this case, again power is applied to the chip, and then a signal is applied to the input of the register and the propagation of the signal observed as an indication of AC performance, i.e. switching delay time.

This invention is a substantial contribution to the advancement of the art of large scale integrated circuit chip fabrication. In this art, a metallization or wiring step requires such an extensive effort and expense that the whole direction of chip fabrication has previously been towards minimizing metallization processing. Therefore, no one would have thought of adding additional metallization steps unless some great advantage would be achieved. In accordance with the present invention, such a great advantage is achieved in the form of accurate and complete AC performance testing which would otherwise be a highly expensive and time consuming effort.

While the invention has been particularly shown and described with reference to the preferred embodiment thereof, it will be understood by those skilled in the art that various changes in form and details may be made therein without departing from the spirit and scope of the invention.

I claim:

1. In the process of fabricating an integrated circuit in which a plurality of integrated circuit elements are formed in a semiconductor chip, an improved method for testing the AC performance of the circuit elements on the chip comprising the steps of:
    a. temporarily interconnecting a group of the circuit elements in a test circuit;
    b. applying D.C. operating potentials to the circuit elements in the test circuit;
    c. measuring the time for an electrical current to propagate through the test circuit; and
    d. interrupting the connections between at least some of the circuit elements in the test circuit prior to interconnnecting the circuit elements in a desired final circuit configuration.

2. The improved method as defined in claim 1 wherein each of the circuit elements is capable of switching in both directions, and wherein said temporary interconnecting step comprises interconnecting an odd number of circuit elements in a recirculating loop test circuit in which the output of each circuit element is connected to the input of another circuit element.

3. The improved method as defined in claim 2 wherein the application of the operating potentials to the recirculation loop causes self-oscillation of the loop, and wherein said measuring step comprises measuring the frequency of self-oscillation of the recirculation loop as an indication of the AC performance of the interconnected circuit elements.

4. The improved method as defined in claim 1 wherein said interrupting step comprises interrupting the connections between all of the circuit elements in the test circuit prior to interconnecting the circuit elements in a desired final circuit configuration.

5. The improved method as defined in claim 1 wherein said temporary interconnecting step comprises temporarily interconnecting substantially all of said plurality of circuit elements in the chip into one or more test circuits.

* * * * *